United States Patent
Kariya et al.

(10) Patent No.: US 8,662,504 B2
(45) Date of Patent: Mar. 4, 2014

(54) TIGHT-SEAL CONSTRUCTION

(75) Inventors: Takahiro Kariya, Arida (JP); Satoshi Tohdoh, Arida (JP)

(73) Assignee: Mitsubishi Cable Industries, Ltd., Tokyo (JP)

(*) Notice: Subject to any disclaimer, the term of this patent is extended or adjusted under 35 U.S.C. 154(b) by 282 days.

(21) Appl. No.: 12/779,174

(22) Filed: May 13, 2010

(65) Prior Publication Data

US 2010/0308545 A1 Dec. 9, 2010

(30) Foreign Application Priority Data

Jun. 4, 2009 (JP) ................................ 2009-135138

(51) Int. Cl.
| | | |
|---|---|---|
| H02G 15/04 | (2006.01) | |
| F16L 21/02 | (2006.01) | |
| H02G 15/013 | (2006.01) | |
| F16L 17/00 | (2006.01) | |
| F16L 17/06 | (2006.01) | |
| F16J 15/02 | (2006.01) | |

(52) U.S. Cl.
USPC ............................ 277/616; 277/609; 277/644

(58) Field of Classification Search
USPC .......................... 277/598, 608, 609, 616, 644
See application file for complete search history.

(56) References Cited

U.S. PATENT DOCUMENTS

| | | | | |
|---|---|---|---|---|
| 3,192,690 A | * | 7/1965 | Taylor | 220/378 |
| 3,578,346 A | * | 5/1971 | Jelinek | 277/611 |
| 3,602,532 A | * | 8/1971 | Ehrenberg | 285/364 |
| 5,713,582 A | * | 2/1998 | Swensen et al. | 277/312 |
| 5,735,532 A | * | 4/1998 | Nolan et al. | 277/630 |
| 6,015,152 A | * | 1/2000 | Swensen et al. | 277/321 |
| 6,357,759 B1 | * | 3/2002 | Azuma et al. | 277/602 |
| 6,409,180 B1 | * | 6/2002 | Spence et al. | 277/608 |
| 6,619,668 B1 | * | 9/2003 | Pyre | 277/644 |
| 6,769,697 B1 | * | 8/2004 | Tsukazaki et al. | 277/612 |
| 6,845,984 B2 | * | 1/2005 | Doyle | 277/317 |
| 6,945,539 B2 | * | 9/2005 | Whitlow et al. | 277/616 |
| 7,004,478 B2 | * | 2/2006 | Spence et al. | 277/644 |
| 7,004,479 B2 | * | 2/2006 | Oida et al. | 277/644 |
| 7,083,171 B2 | * | 8/2006 | Oida et al. | 277/644 |
| RE39,973 E | * | 1/2008 | Spence et al. | 277/608 |
| 2010/0253010 A1 | * | 10/2010 | Tohdoh et al. | 277/608 |
| 2011/0140375 A1 | * | 6/2011 | Sasaki et al. | 277/628 |

FOREIGN PATENT DOCUMENTS

| | | |
|---|---|---|
| JP | 10-209312 | 8/1998 |
| JP | 4091373 | 3/2008 |

* cited by examiner

*Primary Examiner* — Vishal Patel
*Assistant Examiner* — Nicholas L Foster
(74) *Attorney, Agent, or Firm* — Kratz, Quintos & Hanson, LLP

(57) ABSTRACT

A tight-seal construction provided with a metal seal and a holding plate composed of a thin plate having a through window portion. A hitching concave peripheral groove is formed on a peripheral face of the metal seal, and the metal seal is held by the holding plate having a claw portion hitching to the concave peripheral groove and provided with a strap elastic portion protruding from an inner peripheral end edge of the through window portion as to freely and elastically deform in axial directions and radial directions.

3 Claims, 9 Drawing Sheets

TIGHT-SEAL CONSTRUCTION

BACKGROUND OF THE INVENTION

1. Field of the Invention

This invention relates to a construction to tightly seal fluid.

2. Description of the Related Art

In various fluid systems, various sealing materials are used on mutual connecting portions of fluid apparatuses and connecting portions of pipings. However, various apparatuses, becoming highly accurate and having high functions, are used under harsh circumstances for sealing material of rubber and synthetic resin difficult to be applied because of requirements of heat resistance, plasma resistance, and radical resistance. Further, supplied gas has become required to be highly pure with extremely low impurity level in which the above-mentioned sealing material of rubber and synthetic resin is not appropriate.

So the applicants of the present invention proposed a metal seal with torsional elastic deformation to seal two mutually parallel flat faces by metal touch as to correspond to the above-described harsh requirements (refer to Japanese patent No. 4091373, for example).

However, this metal seal may be difficult to attach and may drop out in attachment work. Especially, the metal seal tends to drop when attached toward a vertical face and a ceiling face. So, various holding devices for drop prevention are conventionally proposed (refer to Japanese patent provisional publication No. H10-209312, for example).

However, the conventional holding devices for drop prevention have the following problems.

(i) Although the devices are applicable when the metal seal is deformed by simple compression, it is quite difficult to certainly and stably hold the metal seal torsionally and elastically deformed.

(ii) Although the devices are applicable when the metal seal is deformed by simple compression, the torsional elastic deformation of the metal seal is impeded in the case of the metal seal torsionally and elastically deformed, and the metal seal does not function sufficiently.

(iii) When a holding plate for the metal seal with torsional elastic deformation is provided, dimensions of a sealing groove are different from that of conventional products in many cases, and design of joint main body must be changed.

(iv) The holding plate is also deformed along with the deformation of the torsional elastic deformation of the metal seal, the holding plate interferes with corresponding flat faces and generates abnormalities in fastening load, or sealing ability is reduced and corresponding flat faces are damaged.

(v) A large hitching groove portion is required as in the metal ring having a C-shaped cross section described in Japanese patent provisional publication No. H10-209312.

It is therefore an object of the present invention to provide a tight-seal construction with which the conventional problems are solved, dropping of the metal seal with torsional elastic deformation for sealing can be stably and certainly prevented by a simple and compact holding plate, conventional dimensions of sealing groove can be used without change, corresponding flat faces are not damaged, and fastening load can be held within an appropriate range.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
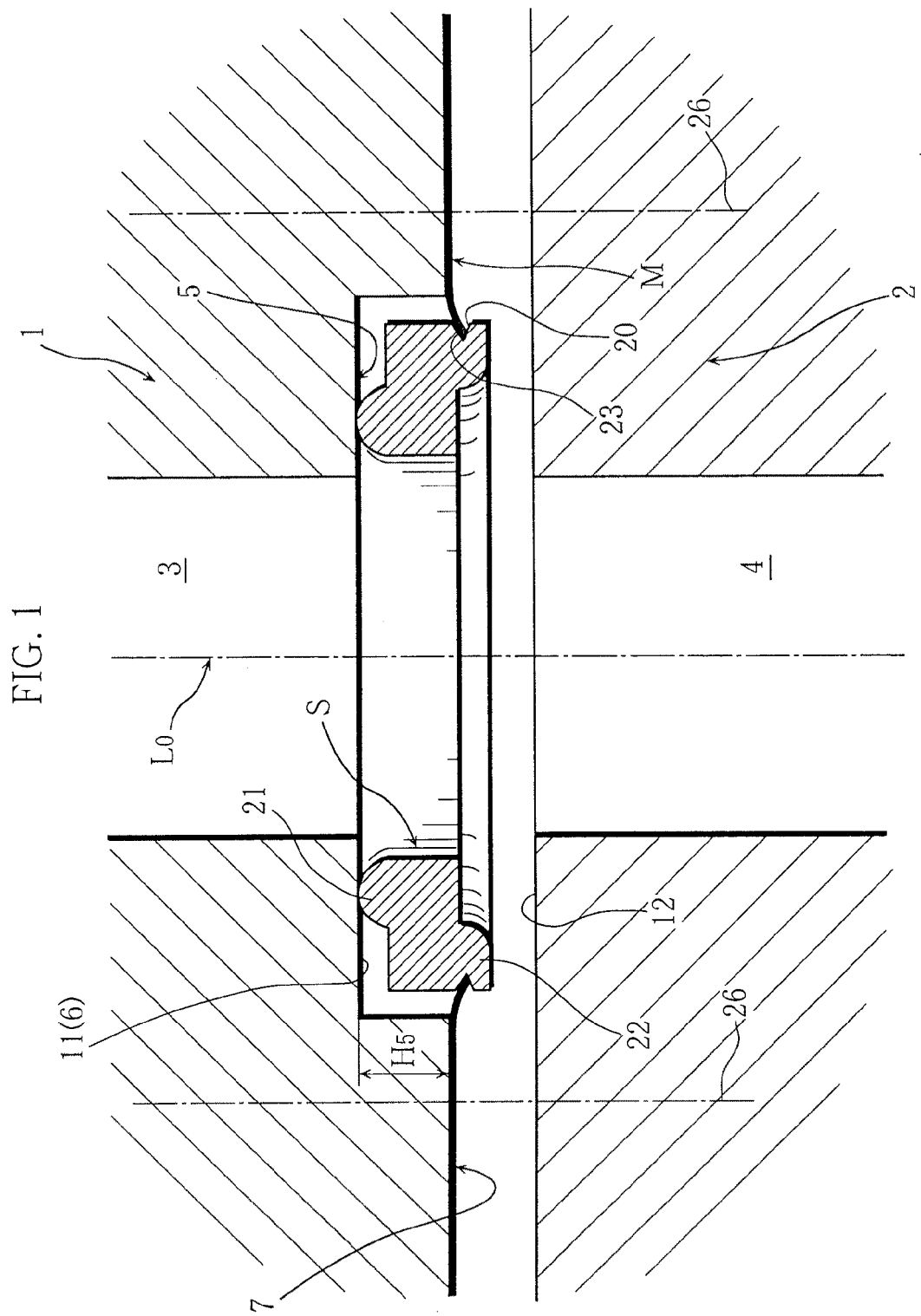
FIG. 1 is a cross-sectional view of a principal portion showing an attached and non-compression state of an embodiment of the present invention.
Figure 2:
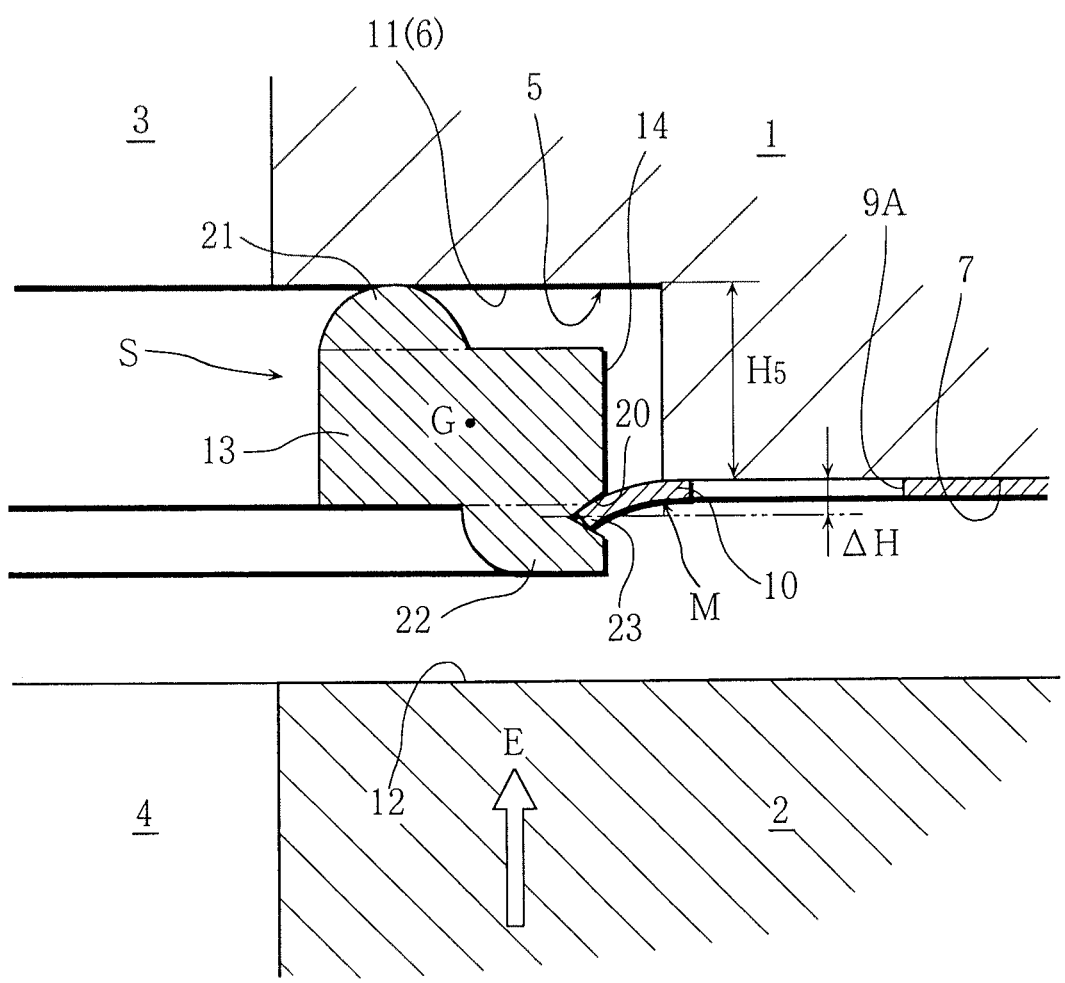
FIG. 2 is an enlarged view of a principal portion of FIG. 1.
Figure 3:
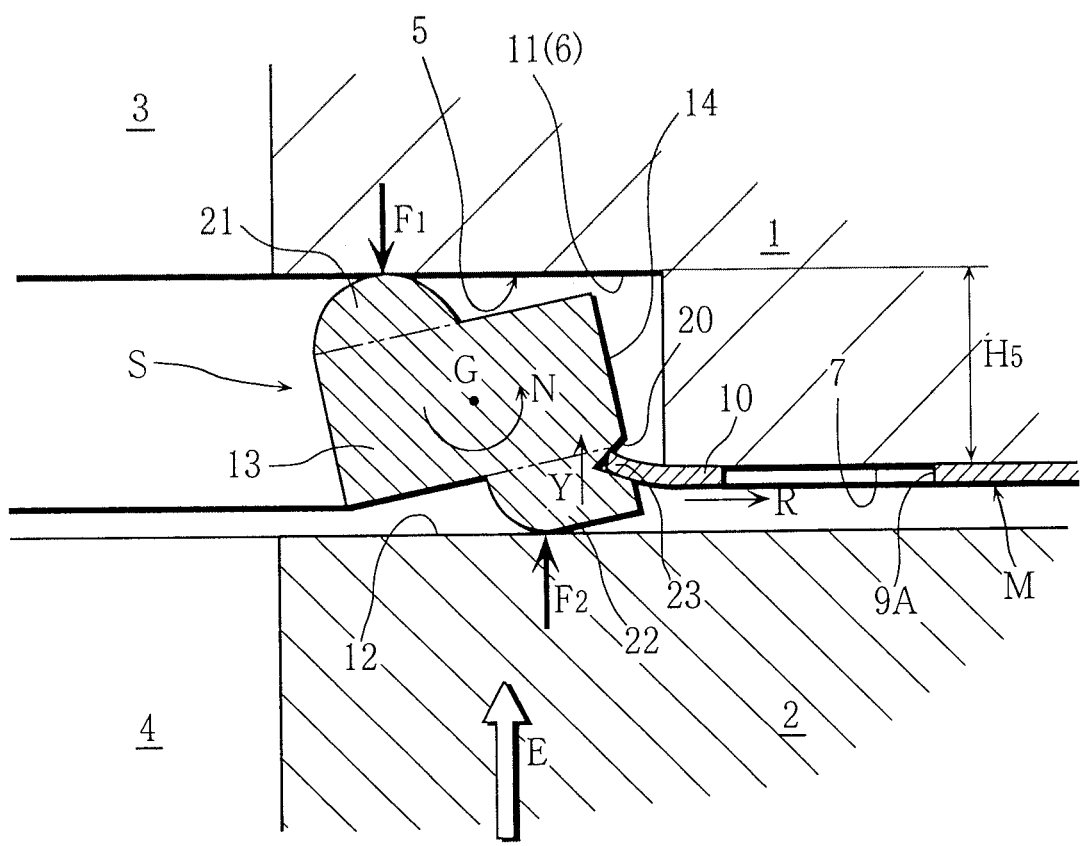
FIG. 3 is an enlarged view of the principal portion in compression state.

In FIGS. 1 through 3, a mark S represents a metal seal composed of metal such as stainless steel, spring steel, etc. and made by cutting, polishing, or plastic work.

The metal seal S is disposed between a first member 1, having a round duct 3, and a second member 2 having a round duct 4 disposed on an axis $L_0$ which is the axis of the duct 3.

A sealing groove 5 is concaved (formed) on the first member 1, and the sealing groove 5 is formed circular concentric with the axis $L_0$ of the duct 3 by cutting an opening end corner to be rectangular in cross-section.

The metal seal S, disposed between a pair of mutually parallel flat faces 11 and 12, is a ring of which whole shape is circular.

In the first member 1 in which the sealing groove 5 is formed, the above-mentioned flat face 11 is composed of a bottom face 6 of the sealing groove 5. That is to say, the flat face 11 of the first member 1 is a flat face retreated from a flat face portion 7 on the opening end side of the sealing groove 5 of the first member 1 for a predetermined depth dimension $H_5$.

A mark M represents a holding plate made by punching or laser cutting of a thin plate, and attached (as shown in later-described FIG. 6) to the flat face portion 7 on the opening end side of the first member 1.

The metal seal S is a closed ring as a whole, disposed between the pair of mutually parallel flat faces 11 and 12 as described above, and the cross-sectional configuration of the metal seal S is block shape having a rectangular middle base portion 13, a first contact convex portion 21 to contact the flat face 11 on one side, and a second contact convex portion 22 to contact the flat face 12 on the other side.

The first contact convex portion 21 is biased toward an inner radial side, and the second contact convex portion 22 is biased toward an outer radial side as to protrude from the middle base portion 13.

In an attached compression state, as shown in (from FIG. 2 to) FIG. 3, torsional elastic deformation to rotate around a center point G of the middle base portion 13 (as shown with an arrow N) is generated by pressing force from the pair of flat faces 11 and 12.

Figure 4A:
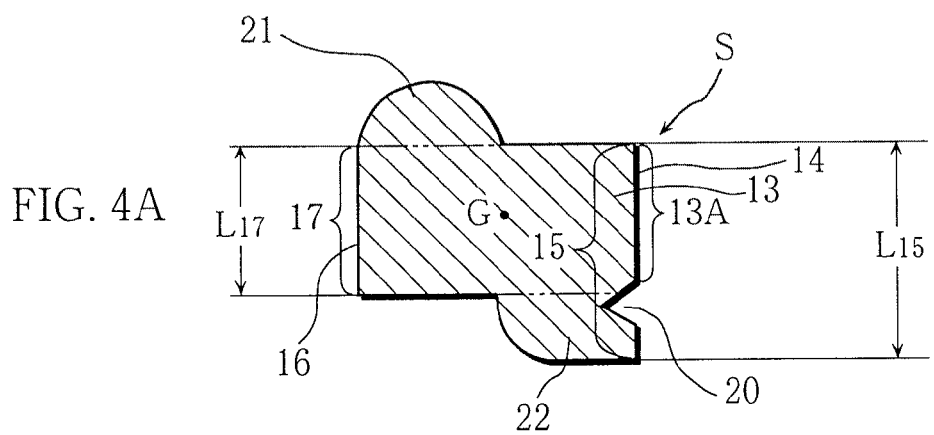
FIG. 4A is an explanatory cross-sectional view of a metal seal.
Figure 4B:
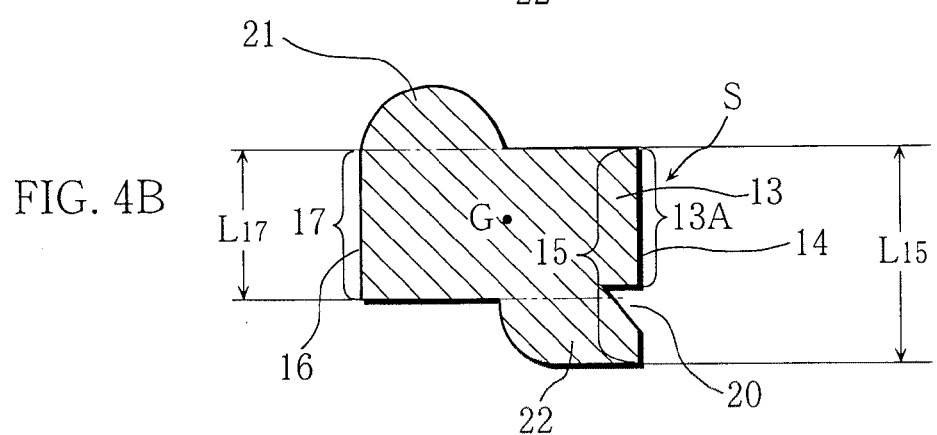
FIG. 4B is an explanatory cross-sectional view of the metal seal.

In Figures, the second contact convex portion 22 is approximately rather large quarter-circular while the first contact convex portion 21 is approximately half-circular. That is to say, as shown in FIGS. 4A and 4B, a short side 13A of the rectangular middle base portion 13 is extended to set a length dimension $L_{15}$ of a straight portion 15 in axial direction of the peripheral face 14 larger than a length dimension $L_{17}$ of a straight portion 17 in axial direction of the inner peripheral face 16, and a concave peripheral groove 20 of which cross section is triangular is formed (by cutting) on the peripheral face 14 near the second contact convex portion 22.

Figure 5:
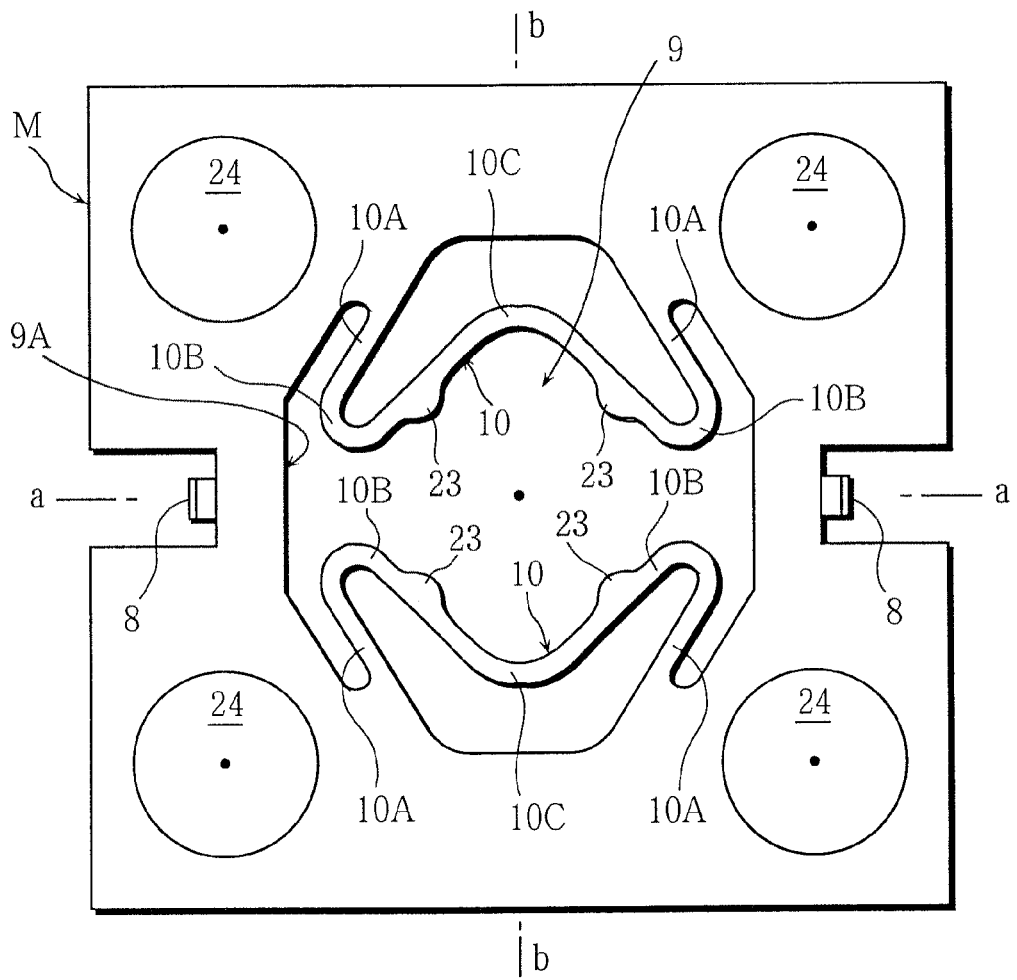
FIG. 5 is a front view of a holding plate.
Figure 9:
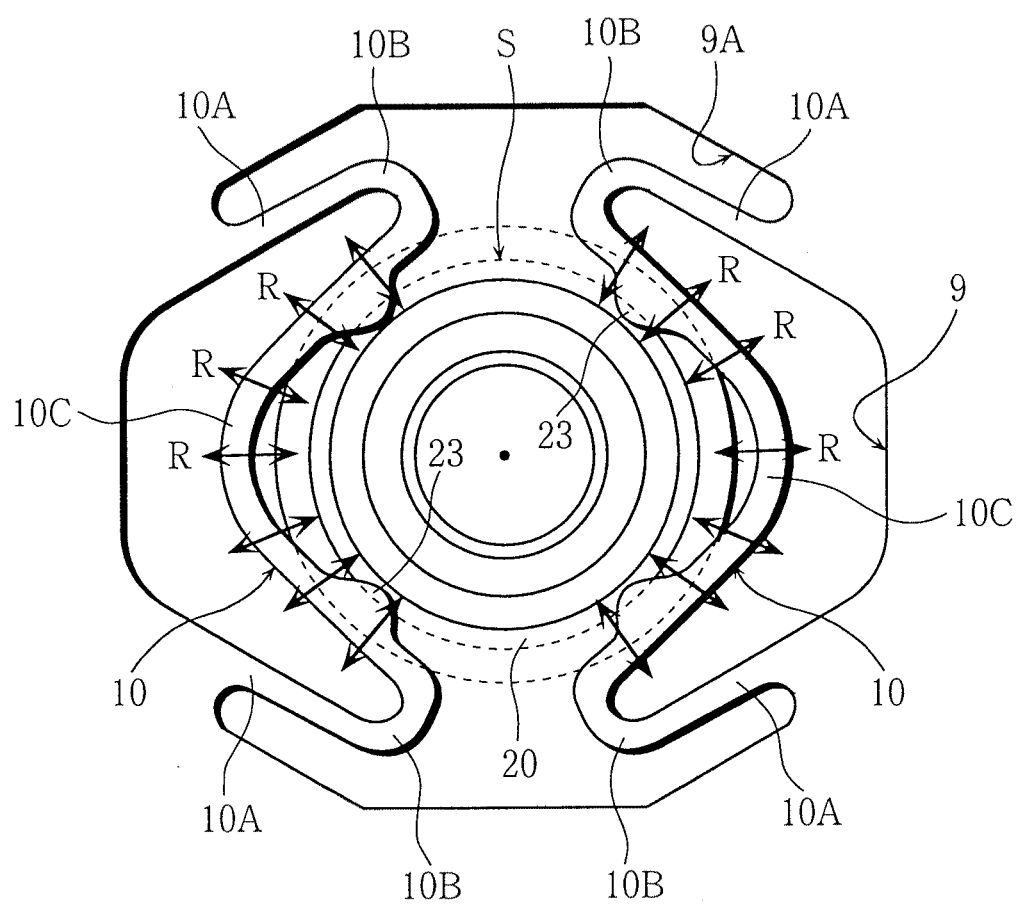
FIG. 9 is an explanatory view of function of the holding plate.

The holding plate M is provided with three or more (4 in Figures) small hill-shaped claw portions 23 as shown in FIGS. 5 and 9, and the claw portions 23 hitch to the concave peripheral groove 20 of the metal seal S to hold the metal seal S as to prevent dropping of the metal seal S from the sealing groove 5.

As shown in FIGS. 5 through 9, the holding plate M composed of thin plate is a flat plate as a whole except U-shaped or J-shaped attachment leg pieces 8, approximately square, and having the through window portion 9 on the center and 4 round holes 24 on 4 corner portions for fastening bolts. And, the through window portion 9 is approximately octagonal, and strap elastic portions 10 protrude from an inner peripheral end edge 9A as to freely and elastically deform in axial directions Y and radial directions R.

The strap elastic portions 10 are symmetrically disposed as one pair. Each of the elastic portions 10 is composed of end portions 10A unitedly connected to the inner peripheral end edge 9A, one pair of U-shaped portions 10B curved into U shape, and a hill-shaped portion 10C convex toward the outer side in the radial direction R.

Foot portions of the elastic portions 10C, namely, connecting portions of the elastic portions 10C and the U-shaped portions 10B, form approximately 90° each other and correspond to the circular peripheral face of the metal seal S as a tangential line. The claw portion 23 is disposed on the connecting portion where the foot portion corresponds to the metal seal S on the tangential line, and the claw portion 23 hitches to the concave peripheral groove 20 of the metal seal S.

And, the dimensions and configuration of the metal seal S and the depth dimension $H_5$ of the sealing groove 5 are set as that the concave peripheral groove 20 of the metal seal S is on an outer position in axial direction against the flat face portion 7 on the opening end side of the sealing groove 5 under the attached and uncompressed state shown in FIG. 1 and FIG. 2.

As clearly shown in FIGS. 1 through 4B, (the center of) the concave peripheral groove 20 can be disposed sufficiently on the outer position in axial direction because the peripheral face 14 has the straight portion 15 of sufficiently large length dimension $L_{15}$, the strap elastic portions 10 of the holding plate M is flat or elastically curved toward the outer side in axial direction as shown in FIG. 2 under the attached and uncompressed state of FIG. 2, and the claw portion 23 hitches to the concave peripheral groove 20 to stop the dropping of the metal seal S. Further, dimensional errors of portions in FIG. 2 can be absorbed, the metal seal S is certainly held within the sealing groove 5 with stable posture, and the first contact convex portion 21 is held as to lightly contact the flat face 11 (the bottom face 6) because the strap elastic portions 10 can be sufficiently deformed elastically in the radial directions R as shown in FIG. 9 and in the axial directions Y (refer to FIG. 8) under the attached and uncompressed state.

The concave peripheral groove 20 for hitching, sufficiently small in comparison with the cross-sectional area of the second contact convex portion 22 and triangular, does not have any problem in strength of the compressed metal seal S in torsional elastic deformation, and, abnormal deformation is not generated. Further, the claw portion 23 of the holding plate M is certainly held as in FIG. 2 and FIG. 3. And, the concave peripheral groove 20, not restricted to an isosceles triangle as in FIG. 4A, may be preferably formed into a scalene triangle (right-angled triangle) as in FIG. 4B.

Stainless steel is appropriate for the holding plate M of the present invention. Other metal material such as Ni alloy, Cu alloy, and Al alloy, can be used, and fluororesin excellent in chemical resistance may be used. Thickness dimension T of the holding plate M, preferable to be thin as long as having sufficient elastic resilience, is 0.08 mm to 1.5 mm.

Figure 6:
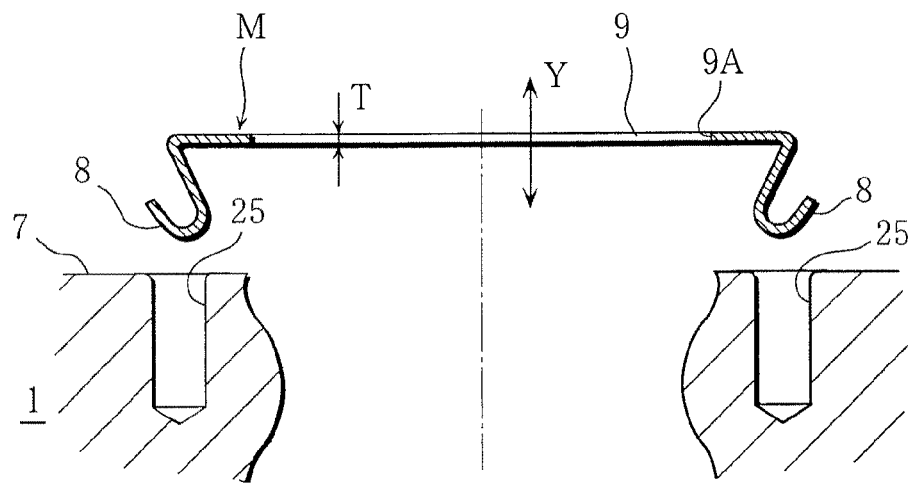
FIG. 6 is a cross-sectional view for explanation of attachment method with a cross section on a-a line of FIG. 5.
Figure 7:
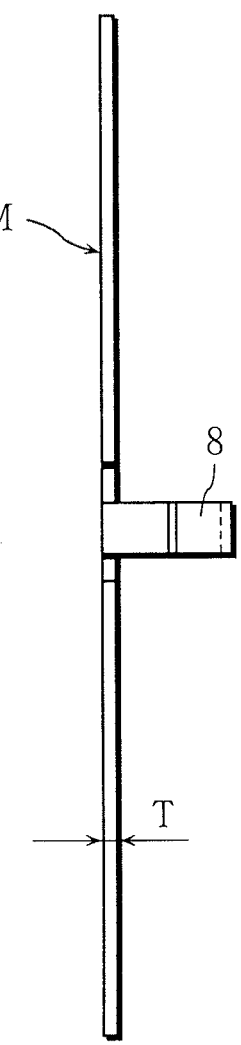
FIG. 7 is a right side view of the holding plate.
Figure 8:
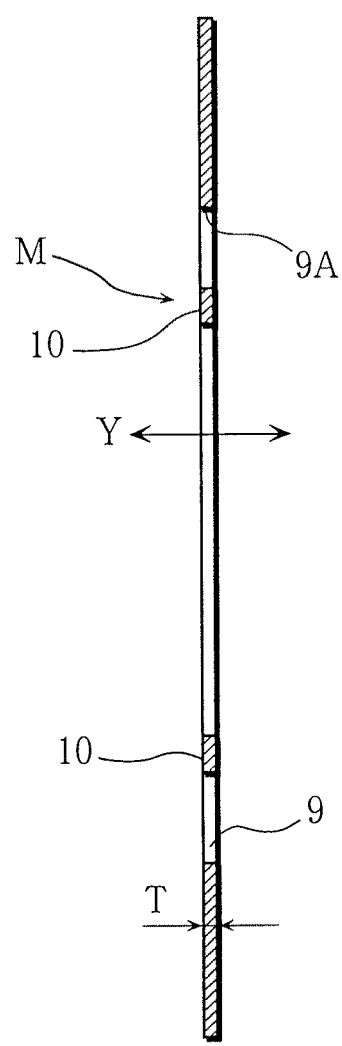
FIG. 8 is a cross section on b-b line of FIG. 5.

FIG. 6, showing an example of attachment construction of the holding plate M, is a cross-sectional view drawn inverted against FIGS. 1 through 3. Two round holes 25 are bored as to have bottoms on the flat face portion 7 of the first member 1, the U-shaped attachment leg pieces 8 are formed on the holding plate M by bending, and the attachment leg pieces 8 are pushed into the round holes 25 and held as not to be easily drawn out by elastic force along with the elastic deformation of the U-shaped attachment leg pieces 8. That is to say, as shown in FIG. 1 and FIG. 2, the holding plate M is touched and held along the flat face portion 7 even if the flat face portion 7 of the first member 1 is directed downward (or in slant or horizontal state not shown in Figures). The number of the attachment leg pieces 8 and the round holes 25 may be increased further.

To explain the function (working) further, the second member 2 in the uncompressed state of FIG. 1 and FIG. 2 is made closer gradually to the first member 1 in an arrow E direction to become the attached and compressed state shown in FIG. 3. That is to say, the metal seal S is rotated in the arrow N direction around the middle base portion 13 (the center point G) as the center by pressing force $F_1$, $F_2$ from the pair of flat faces 11 and 12 and torsional elastic deformation is generated. The torsional elastic deformation returns to the original state as shown in FIG. 1 and FIG. 2 when the pair of flat faces 11 and 12 are departed.

As described above, the metal seal S, artfully and flexibly receiving the pressing force $F_1$, $F_2$ from the pair of flat faces 11 and 12, generates the torsional elastic deformation to rotate in the arrow N direction, does not plastically deform, and does not damage the flat faces 11 and 12.

Then, the concave peripheral groove 20 is slightly moved toward the inner side of the sealing groove 5 in the axial direction Y along with the rotation in the arrow N direction. The claw portion 23, being lightly and elastically deformed in the axial directions Y and the radial directions R, follows the movement because the claw portion 23 is having sufficiently large dimension as shown in FIG. 9 and formed unitedly with the strap elastic portion 10 having plural curved portions.

The first member 1 and the second member 2 are mutually fastened by bolts not shown in Figures. The center line of the bolt is shown with a one-dot broken line 26 in FIG. 1, and the bolt is inserted to the round hole 24 in FIG. 5.

The sealing groove 5 may be omitted when desired. In this case, it is preferable to form the holding plate M, flat plate in FIGS. 5 through 8, into a cubic configuration in which an inner peripheral edge side and an outer peripheral edge side are connected with a stage.

The present invention, not restricted to the embodiment shown in Figures, may be freely modified. Three or more strap elastic portions 10 may be disposed. And, each of the strap elastic portions 10 may be provided with one claw portion 23 or three or more claw portions 23.

In the present invention, the metal seal S can be always held stably and certainly because the claw portion 23 can move flexibly and lightly in the axial directions Y and the radial directions R unitedly with the elastically deformable strap elastic portion 10. Especially, holding function is effectively shown against the metal seal S with torsional elastic deformation in the arrow N direction and the opposite direction.

Further, the claw portion 23 does not contact the flat faces 11 and 12, the flat faces 11 and 12 are not damaged, and excessive fastening force is also prevented. And, the hitching concave peripheral groove 20 can be the minimum size, and abnormal deformation of the metal seal S can be prevented. In other words, the above-described holding plate M relating to the present invention does not impede the sealing function of the metal seal S with torsional elastic deformation, and stable and excellent sealability is shown.

And, it is also advantageous that the dimension and configuration of sealing groove 5 of a conventional metal seal without the holding plate M can be used without change. And, workability of removal in disassembly is good, and the holding plate M can be easily removed and reattached. Further, deviation of the center of the metal seal S is not generated in both of FIG. 2 and FIG. 3, and the metal seal S is held on the axis $L_0$ as the center.

Figure 10:
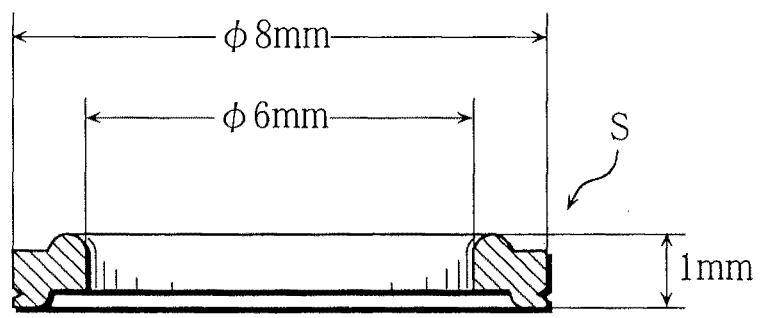
FIG. 10 is a cross-sectional view of a metal seal as an embodiment.
Figure 11:
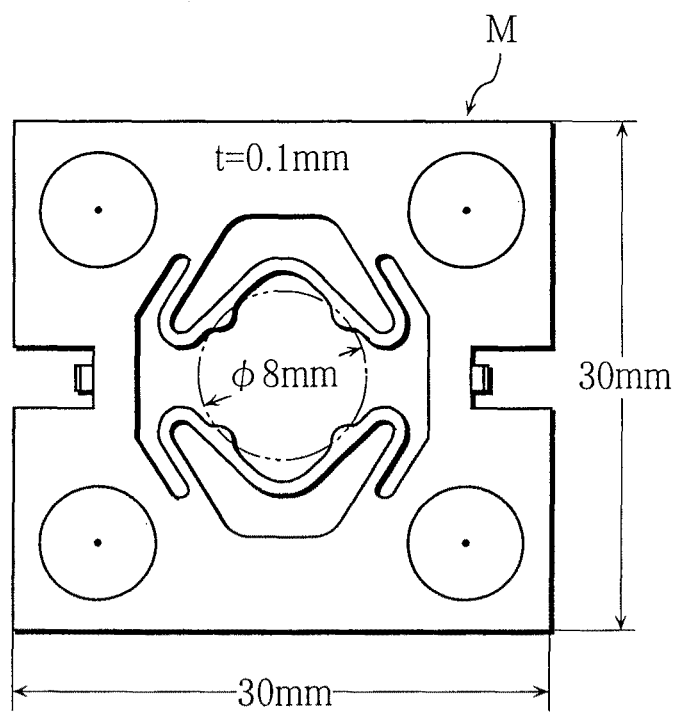
FIG. 11 is a front view of the holding plate showing the embodiment.

Next, the metal seal S having configuration and dimensions as shown in FIG. 10 was made, and, the holding plate M having configuration and dimensions as shown in FIG. 11 was made, and leaking test (hood method) using He gas and heat cycle test (–10° C. ⇔ 180° C.×3 cycles) were conducted.

The test results confirmed that leaking of He gas was not detected and tight-seal function (sealability) is good.

In the present invention, as described above, good tight-seal function (sealability) is shown without hindrance against elastic deformation of the metal seal S and unintentional deviation and dropping of the metal seal S can be prevented because the present invention has the construction in which the metal seal S, in which the hitching concave peripheral groove 20 is formed on the peripheral face 14, and the holding plate M, composed of thin plate having the through window portion 9, having the strap elastic portion 10 protruding from the inner peripheral end edge 9A of the through window portion 9 as to freely and elastically deform in the axial directions Y and the radial directions R, and the claw portion 23 formed unitedly with the strap elastic portion 10 and hitching to the concave peripheral groove 20, are provided. Therefore, in case that the metal seal S is attached to a ceiling and a vertical face, attachment (connection) work can be easily conducted without dropping. For example, the present invention is appropriate for a manufacturing apparatus of semiconductors, and usable for a mass flow meter of gas.

Further, the elastic deformation of the metal seal S is not impeded and tight-seal function is not reduced at all because the holding plate M is freely and flexibly deformed in the axial directions Y and the radial directions R. And, the conventional sealing groove 5 can be used without changing the configuration and dimensions.

Further, the holding plate M can be attached without interference with the flat faces 11 and 12, the flat faces 11 and 12 are not damaged, and excellent tight-seal function is always shown. And, the hitching concave peripheral groove 20 has small dimensions, abnormal deformation of the metal seal S is prevented, and the metal seal S is stably held. Especially, the metal seal S of a type with torsional elastic deformation can be certainly held. And, the whole of the metal seal has compact dimensions.

And, the state in which the claw portion 23 of the holding plate M is certainly hitching to the concave peripheral groove 20 further can be kept because the metal seal S is a ring as a whole disposed between the pair of mutually parallel flat faces 11 and 12, the metal seal S has the block-shaped cross-sectional configuration in which the middle base portion 13, the first contact convex portion 21 touching one of the flat faces 11 and 12, and the second contact convex portion 22 touching the other of the flat faces 11 and 12, are provided, the first contact convex portion 21 is protruding from the inner side and the second contact convex portion 22 is protruding from the outer side, and torsional elastic deformation to rotate around the middle base portion 13 as the center is generated by pressing force from the pair of flat faces 11 and 12 in the attached and compressed state, and the length dimension $L_{15}$ of the straight portion 15 in the axial direction of the peripheral face 14 is set to be larger than the length dimension $L_{17}$ of the straight portion 17 in the axial direction of the inner peripheral face 16 to dispose the concave peripheral groove 20 on the peripheral face 14 near the second contact convex portion 22. Especially, conventionally very difficult holding can be realized by the claw portion 23 on the strip elastic portion 10 flexibly and elastically deforms against the metal seal S of block shape generating torsional elastic deformation.

And, the holding plate M is prevented from biting into a gap between the sealing groove 5 and the metal seal S, and certainly hitching to the concave peripheral groove 20 of the metal seal S with constant smooth elastic deformation to show stable tight-sealing function because the first member 1 having the duct 3 and the second member 2 having the duct 4 are mutually connected, the sealing groove 5 is formed on the first member 1, and the bottom face 6 of the sealing groove 5 is made one of the flat faces 11 and 12, the concave peripheral groove 20 of the metal seal S is on the outer position in axial direction against the flat face portion 7 on the opening end side of the sealing groove 5, and the holding plate M is attached to the flat face portion 7 on the opening end side.

While preferred embodiments of the present invention have been described in this specification, it is to be understood that the invention is illustrative and not restrictive, because various changes are possible within the spirit and indispensable features.

What is claimed is:

1. A tight-seal construction comprising:
    a metal seal capable of torsional elastic deformation having a peripheral face and an inner peripheral face, in which a hitching peripheral groove is formed on the peripheral face; and
    a holding plate, composed of a thin plate having a through window portion, having a symmetrically disposed pair of strap elastic portions each of which is protruding from an inner peripheral end edge of the through window portion capable of freely and elastically deforming in axial directions and radial directions, and each of which is composed of end portions unitedly connected to the inner peripheral end edge, and each of which is defined in part by the through window portion on an axial side and by a respective cut-out on another axial side, the cut-outs being separate from the through window portion, one pair of U-shaped portions, and a hill-shaped portion convex toward the outer side in the radial direction with which the strap elastic portion can elastically move in the radial direction also when the holding plate is flat, and two projections formed unitedly with the strap elastic portion on middle positions of the hill-shaped portion and hitching to the hitching peripheral groove.

2. The tight-seal construction as set forth in claim 1, further comprising:
   a pair of mutually parallel flat faces, wherein the metal seal is a ring as a whole disposed between the pair of mutually parallel flat faces;
   wherein the metal seal has a block-shaped cross-sectional configuration in which a middle base portion, a first contact convex portion touching one of the flat faces, and a second contact convex portion touching the other of the flat faces, are provided, the first contact convex portion is protruding from an inner side and the second contact convex portion is protruding from an outer side, and torsional elastic deformation of the middle base portion around the center of the middle base portion is generated by the pressing force from the pair of flat faces in an attached and compressed state; and
   a length dimension of a straight portion in the axial direction of the peripheral face is larger than a length dimension of a straight portion in the axial direction of the inner peripheral face to dispose the peripheral groove on the peripheral face near the second contact convex portion.

3. The tight-seal construction as set forth in claim 2, further comprising:
   a first member and a second member, respectively having a duct and mutually connected; and
   a sealing groove formed on the first member, wherein a bottom face of the sealing groove is one of the flat faces;
   wherein the peripheral groove of the metal seal is on an outer position in axial direction against a flat face portion on an opening end side of the sealing groove; and
   the holding plate is attached to the flat face portion on the opening end side.

\* \* \* \* \*